US012552062B2

(12) United States Patent
Kim et al.

(10) Patent No.: US 12,552,062 B2
(45) Date of Patent: Feb. 17, 2026

(54) ELECTRODE MANUFACTURING APPARATUS INCLUDING ELECTRODE ALIGNMENT UNIT AND ELECTRODE ASSEMBLY MANUFACTURING APPARATUS

(71) Applicant: LG Energy Solution, Ltd., Seoul (KR)

(72) Inventors: Woong Ki Kim, Daejeon (KR); Sang Don Lee, Daejeon (KR); Dong Soon Choi, Daejeon (KR); Do Seong Han, Daejeon (KR); Sang Uk Yeo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 665 days.

(21) Appl. No.: 17/914,162

(22) PCT Filed: Oct. 15, 2021

(86) PCT No.: PCT/KR2021/014401
§ 371 (c)(1),
(2) Date: Sep. 23, 2022

(87) PCT Pub. No.: WO2022/080968
PCT Pub. Date: Apr. 21, 2022

(65) Prior Publication Data
US 2023/0125899 A1  Apr. 27, 2023

(30) Foreign Application Priority Data
Oct. 16, 2020 (KR) .......... 10-2020-0134691

(51) Int. Cl.
*H01M 10/04* (2006.01)
*B26D 5/00* (2006.01)
*B26D 7/18* (2006.01)

(52) U.S. Cl.
CPC .............. *B26D 5/007* (2013.01); *B26D 7/18* (2013.01); *H01M 10/0404* (2013.01)

(58) Field of Classification Search
CPC .............. B26D 5/007; H01M 10/0404; H01M 4/0435; H01M 10/0413; H01M 10/0436;
(Continued)

(56) References Cited

U.S. PATENT DOCUMENTS 8,455,283 B2 * 6/2013 Takahashi ............ H10K 77/111
438/57
10,069,169 B2 * 9/2018 Yang ................... H01M 4/0402
(Continued)

FOREIGN PATENT DOCUMENTS

CN  110352521 A  10/2019
JP  2019140076 A  8/2019
(Continued)

OTHER PUBLICATIONS

Extended European Search Report including Written Opinion for Application No. 21880614.9 dated May 13, 2024, pp. 1-9.
(Continued)

*Primary Examiner* — Donghai D Nguyen
(74) *Attorney, Agent, or Firm* — Lerner David LLP (57) ABSTRACT

Electrode and electrode assembly manufacturing apparatuses include an electrode transfer unit for transferring an electrode with coating layer on surface of the electrode, a cutter for cutting the electrode transferred by the electrode transfer unit to form a unit electrode, a separator transfer unit disposed at one surface of the electrode transfer unit and configured to transfer a separator, a sensor unit for sensing the position of the unit electrode and an alignment unit for adjusting transfer speeds of outer peripheries of the unit electrode parallel to a unit electrode transfer direction to adjust the interval between unit electrodes seated on a separator surface. Whether positive and negative electrodes are aligned before stacking and laminating electrodes having different polarities is determined. The positive and negative
(Continued)

electrodes are then stacked, whereby the occurrence of a defective electrode due to misalignment between the positive and negative electrodes is preventable.

11 Claims, 3 Drawing Sheets

(58) Field of Classification Search
CPC ... H01M 10/0585; H01M 50/46; Y02P 70/50; Y10T 29/49128; Y10T 29/49108; Y10T 29/49112; H10K 77/111
See application file for complete search history.

(56) References Cited

U.S. PATENT DOCUMENTS

| | | | |
|---|---|---|---|
| 10,981,249 B2* | 4/2021 | Watanabe | B23K 26/402 |
| 2019/0027777 A1 | 1/2019 | Lee et al. | |
| 2019/0277771 A1 | 9/2019 | Kato | |
| 2020/0067051 A1 | 2/2020 | Yamashita et al. | |
| 2020/0212494 A1 | 7/2020 | Kim et al. | |
| 2020/0368846 A1 | 11/2020 | Matsuo | |

FOREIGN PATENT DOCUMENTS

| | | |
|---|---|---|
| KR | 100696811 B1 | 3/2007 |
| KR | 101764718 B1 | 8/2017 |
| KR | 20170114351 A | 10/2017 |
| KR | 101819729 B1 | 3/2018 |
| KR | 101933550 B1 | 12/2018 |
| KR | 101956763 B1 | 3/2019 |
| KR | 20190059676 A | 5/2019 |
| KR | 20190113022 A | 10/2019 |
| KR | 20190113907 A | 10/2019 |
| KR | 20200058956 A | 5/2020 |
| KR | 20200089679 A | 7/2020 |

OTHER PUBLICATIONS

International Search Report for Application No. PCT/KR2021/014401 mailed Jan. 20, 2022, pp. 1-3.

* cited by examiner

ELECTRODE MANUFACTURING APPARATUS INCLUDING ELECTRODE ALIGNMENT UNIT AND ELECTRODE ASSEMBLY MANUFACTURING APPARATUS

CROSS-REFERENCE TO RELATED APPLICATIONS

The present application is a national phase entry under 35 U.S.C. § 371 of International Application No. PCT/KR2021/014401, filed on Oct. 15, 2021, which claims priority from Korean Patent Application No. 2020-0134691, filed on Oct. 16, 2020, the disclosures of which are hereby incorporated herein by reference in their entireties.

FIELD

The present invention relates to an electrode manufacturing apparatus including an electrode alignment unit and an electrode assembly manufacturing apparatus including the same. More particularly, the present invention relates to an electrode manufacturing apparatus including an electrode alignment unit capable of adjusting the transfer direction of unit electrodes cut from an electrode sheet such that the interval between cutting line ends of the unit electrodes is maintained uniform and adjusting alignment between a positive electrode and a negative electrode before a lamination step of an electrode assembly and an electrode assembly manufacturing apparatus including the same.

BACKGROUND

A lithium secondary battery has been used as an energy source for mobile devices and wearable devices and has also been widely used as an energy source for electric vehicles and hybrid electric vehicles.

Depending on the shape of a battery case, a lithium secondary battery is classified as a cylindrical secondary battery having an electrode assembly mounted in a cylindrical metal can, a prismatic secondary battery having an electrode assembly mounted in a prismatic metal can, or a pouch-shaped secondary battery having an electrode assembly mounted in a pouch-shaped case made of an aluminum laminate sheet.

An electrode assembly may be manufactured by stacking a positive electrode and a negative electrode such that a separator is interposed therebetween to manufacture a mono cell and stacking a plurality of mono cells or winding the mono cells in a state of being disposed on a separation film.

In order to manufacture a mono cell, a unit positive electrode cut from a positive electrode sheet is attached to a first separator sheet, a unit negative electrode cut from a negative electrode sheet is attached to a second separator sheet, the first separator sheet, to which the unit positive electrode is attached, and the second separator sheet, to which the unit negative electrode is attached, are stacked, heated, and pressed so as to be laminated with each other. Additionally, the separator sheets between the electrodes may be cut to manufacture an individual mono cell.

In the case in which the interval between unit positive electrodes disposed on the first separator sheet and the interval between unit negative electrodes disposed on the second separator sheet are not maintained uniform and deviate from a predetermined range, a positive electrode and a negative electrode may not be aligned with each other in a subsequent process of stacking and laminating the electrodes.

In a conventional electrode assembly manufacturing apparatus, it is difficult to determine whether the positive electrode and the negative electrode are aligned with each other in a process of stacking and arranging the positive electrode and the negative electrode. Since it is determined whether the positive electrode and the negative electrode are aligned with each other after the lamination process, it is possible to sort and exclude defective electrodes from finally manufactured electrodes; however, it is difficult to lower a defective electrode incidence rate.

Patent Document 1 discloses a mono cell manufacturing method including detecting the position of a negative electrode joined to a belt type separator using a camera configured to detect the joint position of the negative electrode and correcting the position of a positive electrode using a positive electrode alignment tool based on the detected position of the negative electrode.

Patent Document 1 discloses a method of disposing a positive electrode and a negative electrode on opposite surfaces of a separator and disposing another separator on the outer surface of each of the positive electrode and the negative electrode that do not face the separator to manufacture a mono cell but does not disclose a method of controlling the interval between unit electrodes cut from an electrode sheet so as to be uniform.

Patent Document 2 discloses a secondary battery manufacturing apparatus that measures the position of a larger one of a first electrode and a second electrode included in a unit cell, i.e. the first electrode, to adjust the interval between unit cells disposed on a separator sheet in order to accurately maintain the interval between the unit cells and thus to improve stack quality of the unit cell.

However, Patent Document 2 merely suggests technology capable of disposing unit cells, each of which includes a positive electrode and a negative electrode, on a separation sheet such that the interval between the unit cells is maintained uniform.

In the case in which a unit positive electrode is attached to a separator sheet, a unit negative electrode is attached to another separator sheet, and the electrodes are coupled to each other to manufacture a mono cell, 1) positions of the positive electrode and the negative electrode may be changed during movement for coupling therebetween, and 2) it is difficult to dispose the positive electrode and the negative electrode so as to be aligned with each other due to stretching of the separator sheets. In order to solve such problems, there is a need for an electrode manufacturing apparatus capable of aligning a positive electrode and a negative electrode before a lamination process and an electrode assembly manufacturing apparatus including the same.

Korean Patent Application Publication No. 2019-0113907 (2019.10.08) ("Patent Document 1")
Korean Patent Application Publication No. 2019-0113022 (2019.10.08) ("Patent Document 2") SUMMARY OF THE DISCLOSURE It is an object of the present invention to provide an electrode manufacturing apparatus capable of controlling the interval between first unit electrodes attached to a first separator sheet so as to be uniform and the interval between second unit electrodes attached to a second separator sheet so as to be uniform and adjusting the coupling position of the first unit electrode and the second unit electrode such that the first unit electrode and the second unit electrode are aligned with each other before laminating between the first unit electrode and the second unit electrode and an electrode assembly manufacturing apparatus including the same.

In order to accomplish the above object, a first electrode manufacturing apparatus according to the present invention includes a first electrode transfer unit configured to transfer a first electrode having an electrode coating layer formed on one surface or opposite surfaces thereof; a first cutter configured to cut the first electrode transferred by the first electrode transfer unit in order to form a first unit electrode; a first separator transfer unit disposed at one surface of the first electrode transfer unit, the first separator transfer unit being configured to transfer a first separator; a first sensor unit configured to sense the position of the first unit electrode; and a first alignment unit configured to adjust transfer speeds of outer peripheries of the first unit electrode parallel to a transfer direction thereof in order to adjust the interval between the first unit electrodes that are seated on one surface of the first separator.

In the first electrode manufacturing apparatus according to the present invention, the first sensor unit may include two or more sensors configured to sense speeds of the outer peripheries of the first unit electrode parallel to the transfer direction thereof, and the first alignment unit may include at least two correction rolls disposed at one surface of the first unit electrode.

In the first electrode manufacturing apparatus according to the present invention, when cut outer peripheries of the first unit electrode measured by the first sensor unit are not disposed perpendicular to the transfer direction, the first alignment unit may adjust supply speeds of both ends of the first unit electrode that is supplied to the first separator.

In addition, the present invention provides an electrode assembly manufacturing apparatus including a first electrode supply unit configured to transfer the first unit electrode manufactured by the first electrode manufacturing apparatus; a third sensor unit configured to sense the position of the first unit electrode; a second electrode manufacturing apparatus configured to manufacture a second electrode; and a coupling unit configured to couple the first unit electrode and the second unit electrode to each other to manufacture a mono cell, wherein the second electrode manufacturing apparatus includes a second electrode transfer unit configured to transfer a second electrode having an electrode coating layer formed on one surface or opposite surfaces thereof; a second cutter configured to cut the second electrode transferred by the second electrode transfer unit to form a second unit electrode; a second separator transfer unit disposed at one surface of the second electrode transfer unit, the second separator transfer unit being configured to transfer a second separator; a second sensor unit configured to sense the position of the second unit electrode; and a second alignment unit configured to adjust transfer speeds of both ends of the second unit electrode parallel to a transfer direction thereof in order to adjust the interval between the second unit electrodes that are seated on one surface of the second separator.

In the electrode assembly manufacturing apparatus according to the present invention, the second alignment unit may adjust the interval between the second unit electrodes based on the position of the first unit electrode sensed by the third sensor unit such that the second unit electrode is aligned with the first unit electrode at the coupling unit.

In the electrode assembly manufacturing apparatus according to the present invention, the second sensor unit may include two or more sensors configured to sense positions of opposite side outer peripheries of the second unit electrode parallel to the transfer direction thereof, the third sensor unit may include two or more sensors configured to sense positions of opposite side outer peripheries of the first unit electrode parallel to the transfer direction thereof, and the second alignment unit may include at least two correction rolls disposed at one surface of the second unit electrode.

In the electrode assembly manufacturing apparatus according to the present invention, the correction rolls may be disposed at the upper surface of the second unit electrode, a transfer roll may be disposed under the correction rolls as the lower surface of the second unit electrode, and the transfer roll may be configured to have a structure in which a plurality of rollers, speeds of which are capable of being controlled so as to be equal to rotational speeds of the correction rolls, is coupled to each other.

In the electrode assembly manufacturing apparatus according to the present invention, the coupling unit may include a rolling roll configured to laminate the first unit electrode and the second unit electrode with each other.

In the electrode assembly manufacturing apparatus according to the present invention, a third cutter configured to cut the first separator and the second separator of the mono cell to manufacture a unit mono cell may be included.

In the electrode assembly manufacturing apparatus according to the present invention, a vision inspection unit configured to inspect an aligned state of the first unit electrode and the second unit electrode of the unit mono cell may be further included.

In the electrode assembly manufacturing apparatus according to the present invention, a control variable of the second alignment unit may be adjusted based on the result of inspection of the vision inspection unit. The control variable of the second alignment unit may be the rotational speed of the correction roll of the second alignment unit.

In addition, the present invention may provide all possible combinations of the above solving means.

As is apparent from the above description, in the present invention, it is possible to adjust transfer speeds of opposite side outer peripheries of unit electrodes that are attached to a separator sheet in a transfer direction thereof while sensing the interval between the unit electrodes, whereby it is possible to maintain the interval between the unit electrodes that are attached to the separator sheet so as to be uniform.

In addition, the above process is identically performed for a positive electrode and a negative electrode.

In addition, the position of one of the positive electrode and the negative electrode is sensed in order to adjust the position of the other electrode in a step before coupling between the positive electrode and the negative electrode such that the coupling positions of the positive electrode and the negative electrode coincide with each other, whereby it is possible for the positive electrode and the negative electrode to be coupled to each other in a state of being aligned with each other.

In the present invention, control may be performed such that stacked positions of the positive electrode and the negative electrode coincide with each other before a lamination process in which the positive electrode and the negative electrode are stacked and coupled to each other, whereby it is possible to prevent misalignment between the positive electrode and the negative electrode.

In the present invention, it is possible to prevent a decrease in capacity of a battery due to misalignment between the positive electrode and the negative electrode and to prevent a decrease in energy density of the battery due to an increase in volume of an electrode assembly.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded but means that such elements may be further included unless mentioned otherwise.

Embodiments of the present invention will be described in detail with reference to the accompanying drawings.

Figure 1:
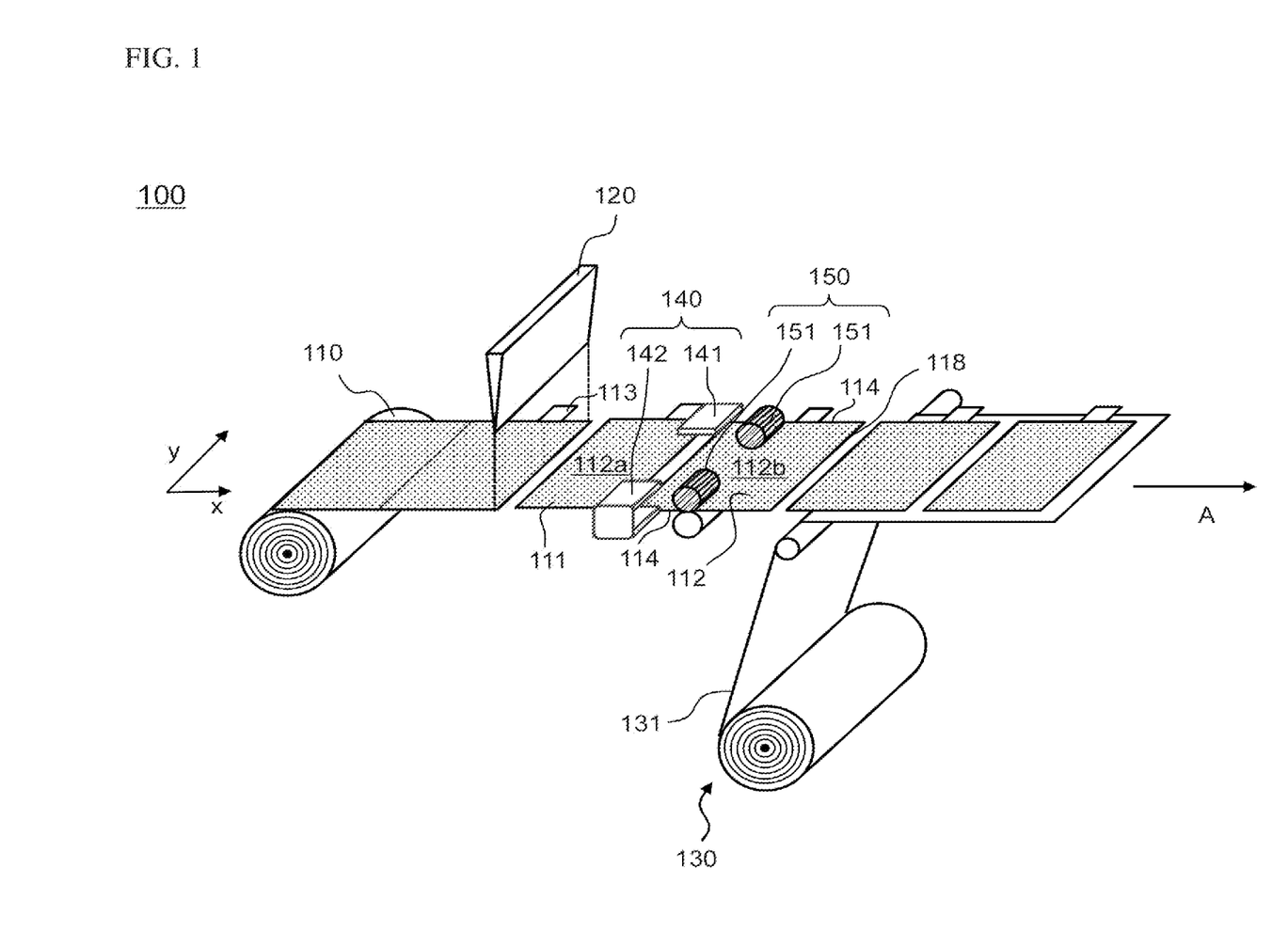
FIG. 1 is a perspective view of an electrode manufacturing apparatus according to an embodiment.

FIG. 1 is a perspective view of an electrode manufacturing apparatus according to an embodiment.

Referring to FIG. 1, the electrode manufacturing apparatus 100 is a first electrode manufacturing apparatus, and the first electrode may be a positive electrode or a negative electrode.

The electrode manufacturing apparatus 100 includes a first electrode transfer unit 110 configured to transfer a first electrode 111 having an electrode coating layer formed on one surface or opposite surfaces thereof; a first cutter 120 configured to cut the first electrode 111 transferred by the first electrode transfer unit 110 to form a first unit electrode 112; a first separator transfer unit 130 disposed at one surface of the first electrode transfer unit 110, the first separator transfer unit being configured to transfer a first separator 131; a first sensor unit 140 configured to sense the position of the first unit electrode 112; and a first alignment unit 150 configured to adjust transfer speeds of outer peripheries 114 of the first unit electrode 112 parallel to a transfer direction A thereof in order to adjust the interval between first unit electrodes 112 that are seated on one surface of the first separator 131.

The first electrode 111 is configured in the form of an electrode roll in which an electrode sheet is wound, and the electrode sheet has an electrode coating layer formed on one surface or opposite surfaces of electrode foil. A non-coating portion having no electrode coating layer is formed on at least one side of the electrode sheet having the electrode coating layer formed thereon, and the first electrode may be in a state in which a portion of the non-coating portion is punched to form an electrode tab.

The first separator 131 may be configured in the form of a separator roll in which a separator sheet is wound or may be configured to have a size such that surplus portions further extend from outer peripheries of one first unit electrode.

The first sensor unit 140 includes sensors 141 and 142 configured to sense speeds of the outer peripheries 114 of the first unit electrode 112 parallel to the transfer direction A thereof. Each of the sensors is disposed at a corresponding one of the outer peripheries of the first unit electrode 112 parallel to the transfer direction A thereof.

Each of the sensors 141 and 142 includes a transmitter configured to transmit a signal and a receiver configured to receive the signal, and the transmitter and the receiver are disposed so as to face each other. The first unit electrode passes between the transmitter and the receiver. The position at which the first unit electrode is disposed, the movement speed of the first unit electrode, the degree of alignment of opposite sides of the first unit electrode, and the interval between the first unit electrodes may be derived based on whether light or a wavelength transmitted by the transmitter is received by the receiver, reception time, and non-reception time.

In the case in which values of the interval between the first unit electrodes measured by the sensors are inconsistent with each other, it may be determined that the first unit electrode is rotated or deviates from the movement position thereof, and the first sensor unit may send a calibration signal to the first alignment unit such that the movement direction of the first unit electrode is adjusted.

Although the concrete positions of the sensors 141 and 142 are not specified as long as the sensors sense the positions of both ends of the cut outer peripheries 118 of the first unit electrodes in order to measure the interval between the first unit electrodes, it is preferable for the sensors to be disposed at the outer peripheries 114 of the first unit electrode parallel to the transfer direction thereof in order to improve measurement accuracy, as shown in FIG. 1.

The first alignment unit 150 includes two correction rolls 151 disposed at one surface of the first unit electrode 112.

In the case in which the cut outer peripheries 118 of the first unit electrode measured by the first sensor unit 140 are not disposed perpendicular to the transfer direction A thereof, the measured value may be sent to the first alignment unit 150 in order to adjust the movement direction of the first unit electrode. The correction rolls 151 of the first alignment unit 150 may adjust supply speeds of both ends of the first unit electrode 112 that is supplied to the first separator 131 in a y-axis direction.

Rotational speeds of the correction rolls 151 may be independently adjusted. The rotational speed of one of the correction rolls 151 may be increased or decreased such that the interval between the first unit electrodes measured by the first sensor unit 140 is within an allowable range.

For example, in the case in which, for adjacent first unit electrodes 112, the interval between the first unit electrodes measured by the sensor 141 located at the side at which the first electrode tab 113 is provided is greater than the interval between the first unit electrodes 112 measured by the sensor 142 located at the side at which no electrode tab is provided, it is possible to increase the rotational speed of the correction roll located at the side at which the electrode tab is provided. As described above, the first unit electrode may be rotated from a central axis of the first unit electrode 112 in an x-axis direction in order to change the movement direction of the first unit electrode. Even though there occurs deviation in movement direction of the first unit electrode due to partial stretching of the first separator or drooping of the first electrode, the interval between the first unit electrodes may be maintained uniform.

The correction rolls 151 are disposed at the upper surface of the first unit electrode 112, and are disposed at both ends of the first unit electrode in the y-axis direction, not a central part of the first unit electrode.

Although the positions of the correction rolls of the first alignment unit are not particularly restricted as long as the first unit electrode is rotated from the central axis of the first unit electrode in the x-axis direction in order to change the movement direction of the first unit electrode, it is preferable for the correction rolls to be disposed at both ends of the outer peripheries of the first unit electrode parallel to the transfer direction thereof in consideration of efficiency in control of the first unit electrode.

Meanwhile, even though the result measured by the first sensor unit is transmitted to the first alignment unit and the movement direction of the first unit electrode is accurately changed, the movement direction of the first unit electrode may be changed again while the first unit electrode having the changed movement direction is transferred so as to be attached to the first separator. Consequently, it is necessary for the first sensor unit and the first alignment unit to be disposed adjacent to each other.

For example, the first sensor unit 140 is disposed to measure the interval between a first unit electrode 112b transferred so as to be attached to the first separator 131 and a first unit electrode 112a transferred immediately after the first unit electrode 112b. The first alignment unit 150 may be disposed on the first unit electrode 112b, and the first alignment unit 150 may control the movement speed and the movement direction of the first unit electrode 112b based on the interval between the first unit electrodes measured by the first sensor unit 140.

Although omitted from FIG. 1, in the first electrode manufacturing apparatus including the first electrode transfer unit and the first separator transfer unit, the first electrode, the first unit electrode, and the first separator may be transferred by a roller type or conveyor-type transfer device disposed thereunder. In addition, an electrode may be manufactured in a region in which central axes of the first electrode, the first unit electrode, and the first separator, and the correction roll in the transfer direction thereof are parallel to each other.

That is, relative speeds of opposite side outer peripheries of the first unit electrode parallel to the transfer direction thereof may be adjusted based on the transfer speed of the central axis of the first unit electrode in the transfer direction thereof in order to attach the first unit electrode to the first separator.

Figure 2:
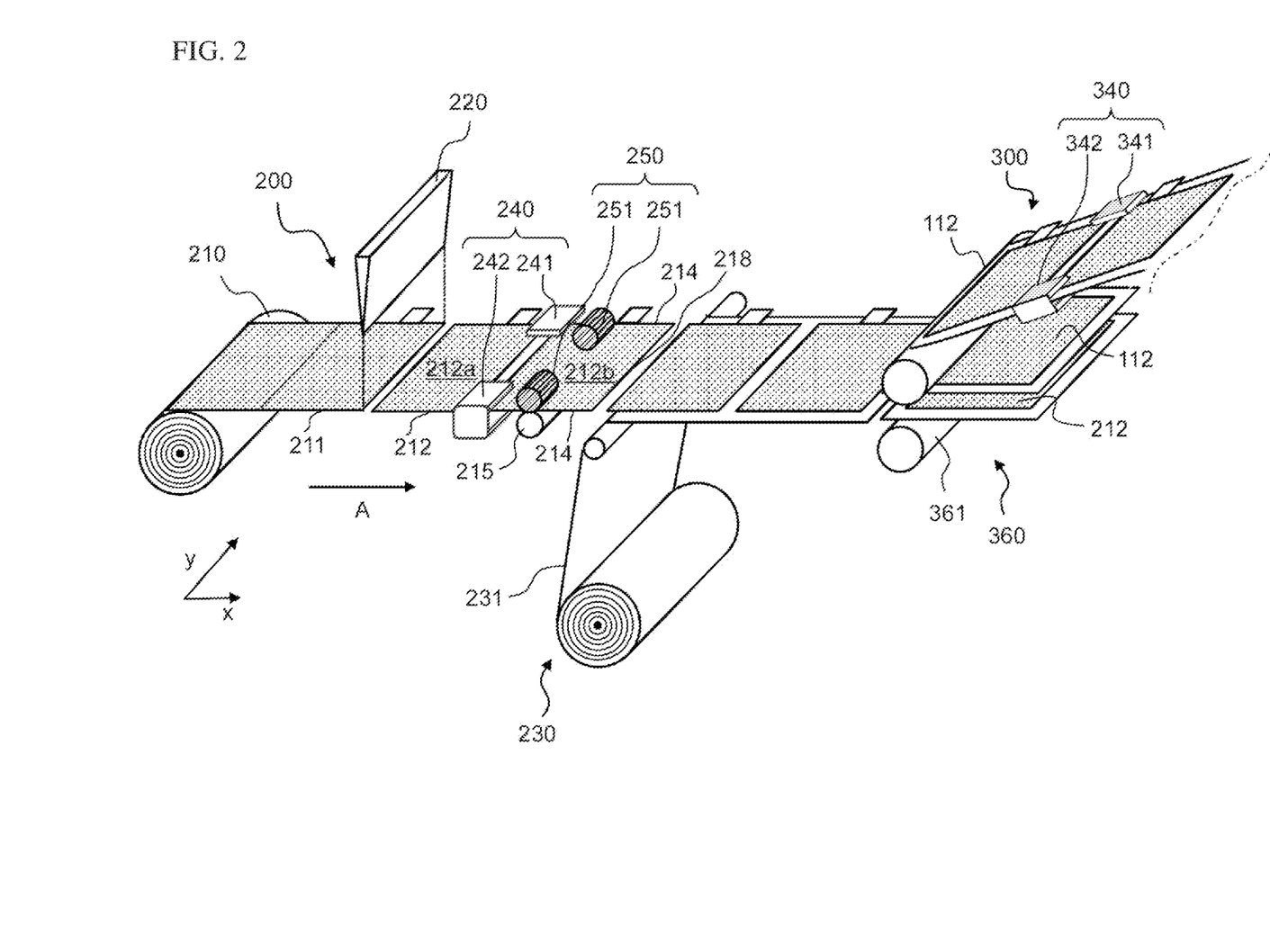
FIG. 2 is a perspective view of an electrode assembly manufacturing apparatus according to an embodiment.

FIG. 2 is a perspective view of an electrode assembly manufacturing apparatus according to an embodiment.

Referring to FIG. 2, the electrode assembly manufacturing apparatus includes a first electrode supply unit 300 configured to transfer the first unit electrode 112 manufactured by the first electrode manufacturing apparatus 100 of FIG. 1; a third sensor unit 340 configured to sense the position of the first unit electrode 112; a second electrode manufacturing apparatus 200 configured to manufacture a second electrode 212; and a coupling unit 360 configured to couple the first unit electrode 112 and the second unit electrode 212 to each other to manufacture a mono cell. The second electrode manufacturing apparatus 200 includes a second electrode transfer unit 210 configured to transfer a second electrode 211 having an electrode coating layer formed on one surface or opposite surfaces thereof; a second cutter 220 configured to cut the second electrode 211 transferred by the second electrode transfer unit 210 to form a second unit electrode 212; a second separator transfer unit 230 disposed at one surface of the second electrode transfer unit 210, the second separator transfer unit being configured to transfer a second separator 231; a second sensor unit 240 configured to sense the position of the second unit electrode 212; and a second alignment unit 250 configured to adjust transfer speeds of both ends of the second unit electrode 212 parallel to a transfer direction thereof in order to adjust the interval between second unit electrodes 212 that are seated on one surface of the second separator 231.

The description of the first electrode transfer unit, the first cutter, the first separator transfer unit, the first sensor unit, and the first alignment unit of the first electrode manufacturing apparatus 100 may be equally applied to the second electrode transfer unit 210, the second cutter 220, the second separator transfer unit 230, the second sensor unit 240, and the second alignment unit 250 of the second electrode manufacturing apparatus 200, respectively, and therefore a detailed description thereof may be understood within the same category.

The third sensor unit 340 measures the interval between the first unit electrodes 112 that are transferred so as to overlap the second unit electrodes 212. The third sensor unit 340 includes sensors 341 and 342 configured to sense speeds of the outer peripheries of the first unit electrode 112 parallel to the transfer direction thereof. Each of the sensors is disposed at a corresponding one of the outer peripheries of the first unit electrode 112 parallel to the transfer direction thereof. The operating principle and function of the sensors 341 and 342 are the same as the operating principle and function of the sensors 141 and 142 described with reference to FIG. 1.

The second alignment unit 250 may adjust the interval between the second unit electrodes 212 based on the position of the first unit electrode 112 sensed by the third sensor unit 340 such that the second unit electrode 212 is aligned with the first unit electrode 112 at the coupling unit 360.

The second sensor unit 240 includes sensors 241 and 242 configured to sense positions of opposite side outer peripheries 214 of the second unit electrode 212 parallel to the transfer direction thereof, and the third sensor unit 340 includes sensors 341 and 342 configured to sense positions of opposite side outer peripheries of the first unit electrode parallel to the transfer direction thereof. The second alignment unit 250 includes two correction rolls 251 disposed at the upper surface of the second unit electrode 212.

Consequently, whether the interval between the cut outer periphery 218 of the second unit electrode 212 measured by the sensors 241 and 242 of the second sensor unit 240 and the cut outer periphery of a neighboring second unit electrode is uniform is measured. In the case in which the intervals are inconsistent with each other, a calibration signal is sent to the second alignment unit 250 such that the transfer speeds of the outer peripheries of the second unit electrode 212 parallel to the transfer direction thereof is changed.

Consequently, control may be performed such that the rotational speeds of the correction rolls configured to transfer the second unit roll are changed, whereby it is possible to correct the movement direction and position of the second unit electrode.

For example, the second sensor unit 240 is disposed to measure the interval between a second unit electrode 212b transferred so as to be attached to the second separator 231 and a second unit electrode 212a transferred immediately after the second unit electrode 212b. The third sensor unit 340 is disposed to measure the interval between the first unit electrodes 112.

The second alignment unit 250 is disposed on the second unit electrode 212b and transfers the second unit electrode to the first unit electrode so as to have the interval between the first unit electrodes 112 measured by the third sensor unit 340.

In the case in which the interval between the second unit electrodes measured by the second sensor unit 240 is inconsistent with the interval between the first unit electrodes measured by the third sensor unit 340, therefore, the second alignment unit 250 may control the movement speed and movement direction of the second unit electrode 212.

In a concrete example, the correction rolls 251 may be disposed at the upper surface of the second unit electrode 212, a transfer roll 215 may be disposed under the correction rolls 251 as the lower surface of the second unit electrode 212, and the transfer roll 215 may be configured to have a structure in which a plurality of rollers, speeds of which are capable of being controlled so as to be equal to the rotational speeds of the correction rolls 251, is coupled to each other.

The overall length of the transfer roll 215 may be longer than the y-axis length of the second unit electrode.

The coupling unit 360 includes a pair of rolling rolls 361 disposed above the first unit electrode 112 and under the second unit electrode 212 in order to laminate the first unit electrode 112 and the second unit electrode 212 with each other. The rolling rolls 361 may be configured to be selectively heated.

Figure 3:
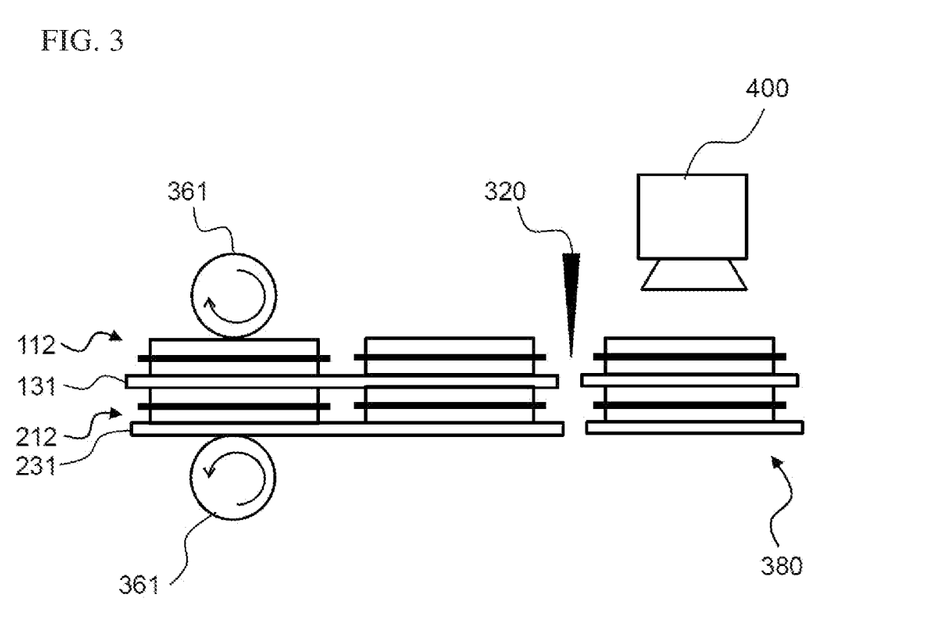
FIG. 3 is a side view of a mono cell passing through a vision inspection unit in an embodiment.

FIG. 3 is a side view of a mono cell passing through a vision inspection unit in the present invention.

Referring to FIG. 3, a first unit electrode 112 is disposed on a first separator 131, and a second unit electrode 212 is disposed on a second separator 231. It is possible to manufacture a mono cell configured such that the force of coupling between the first separator 131, the first unit electrode 112, the second unit electrode 212, and the second separator 231 is increased by pressing of the rolling rolls 361.

The electrode assembly manufacturing apparatus according to the present invention includes a third cutter 320 configured to cut the first separator 131 and the second separator 231 of the mono cell in order to manufacture a unit mono cell 380 and includes a vision inspection unit 400 configured to inspect the aligned state of the first unit electrode 112 and the second unit electrode 212 of the unit mono cell 380.

In the case in which the first unit electrode and the second unit electrode are not aligned with each other as the result of measurement of the vision inspection unit 400, a control variable of the second alignment unit may be adjusted, and the second alignment unit may adjust the position and movement direction of the second unit electrode such that the first unit electrode and the second unit electrode are aligned with each other.

In the present invention, as described above, it is possible to determine whether the positive electrode and the negative electrode are aligned with each other in a step before manufacture of the mono cell, whereby it is possible to prevent manufacture of an electrode assembly having stack defects.

Those skilled in the art to which the present invention pertains will appreciate that various applications and modifications are possible within the category of the present invention based on the above description.

DESCRIPTION OF REFERENCE SYMBOLS

100: Electrode manufacturing apparatus
110: First electrode transfer unit
111: First electrode
112, 112a, 112b: First unit electrodes
113: First electrode tab
114, 214: Outer peripheries parallel to transfer movement
118, 218: Cut outer peripheries
120: First cutter
130: First separator transfer unit
131: First separator
140: First sensor unit
141, 142, 241, 242, 341, 342: Sensors
150: First alignment unit
151, 251: Correction rolls
200: Second electrode manufacturing apparatus
210: Second electrode transfer unit
211: Second electrode
212, 212a, 212b: Second unit electrodes
215: Transfer roll
220: Second cutter
230: Second separator transfer unit
231: Second separator
240: Second sensor unit
250: Second alignment unit
300: First electrode supply unit
340: Third sensor unit
360: Coupling unit
361: Rolling roll
320: Third cutter
380: Unit mono cell
400: Vision inspection unit The present invention relates to an electrode manufacturing apparatus including a first electrode transfer unit configured to transfer a first electrode having an electrode coating layer formed on one surface or opposite surfaces thereof; a first cutter configured to cut the first electrode transferred by the first electrode transfer unit in order to form a first unit electrode; a first separator transfer unit disposed at one surface of the first electrode transfer unit, the first separator transfer unit being configured to transfer a first separator; a first sensor unit configured to sense the position of the first unit electrode; and a first alignment unit configured to adjust transfer speeds of both ends of the first unit electrode parallel to a transfer direction thereof in order to adjust the interval between the first unit electrodes that are seated on one surface of the first separator and an electrode assembly manufacturing apparatus including the electrode manufacturing apparatus, wherein it is determined whether a positive electrode and a negative electrode are aligned with each other before a process of stacking and laminating electrodes having different polarities, and then the positive electrode and the negative electrode are stacked, whereby it is possible to prevent the occurrence of a defective electrode due to misalignment between the positive electrode and the negative electrode.

The invention claimed is:

1. A first electrode manufacturing apparatus comprising:
a first electrode transfer unit configured to transfer first electrodes, at least one of the first electrodes being coated with an electrode coating layer;
a first cutter configured to cut the first electrodes when transferred by the first electrode transfer unit and thereby form first unit electrodes;
a first separator transfer unit disposed at one surface of the first electrode transfer unit, the first separator transfer unit being configured to transfer a first separator;
a first sensor unit configured to sense a position of each of the first unit electrodes; and
a first alignment unit configured to adjust transfer speeds of outer peripheries of the first unit electrodes parallel to a transfer direction of the first unit electrodes in order to adjust an interval between the first unit electrodes that are seated on one surface of the first separator, wherein the first alignment unit comprises at least two correction rolls disposed at one surface of the first unit electrode.

2. The first electrode manufacturing apparatus according to claim 1, wherein:

the first sensor unit comprises two or more sensors configured to sense speeds of the outer peripheries of each of the first unit electrodes parallel to the transfer direction of the first unit electrodes.

3. The first electrode manufacturing apparatus according to claim 2, wherein when outer peripheries of one the first unit electrodes measured by the first sensor unit are not disposed perpendicular to the transfer direction, the first alignment unit adjusts supply speeds of both ends of such one of the first unit electrodes that is supplied to the first separator.

4. An electrode assembly manufacturing apparatus comprising:

a first electrode supply unit configured to transfer each of the first unit electrodes manufactured by the first electrode manufacturing apparatus comprising:

a first electrode transfer unit configured to transfer first electrodes, at least one of the first electrodes being coated with an electrode coating layer;

a first cutter configured to cut the first electrodes when transferred by the first electrode transfer unit and thereby form first unit electrodes;

a first separator transfer unit disposed at one surface of the first electrode transfer unit, the first separator transfer unit being configured to transfer a first separator;

a first sensor unit configured to sense a position of each of the first unit electrodes; and a first alignment unit configured to adjust transfer speeds of outer peripheries of the first unit electrodes parallel to a transfer direction of the first unit electrodes in order to adjust an interval between the first unit electrodes that are seated on one surface of the first separator;

a third sensor unit configured to sense a position of each of the first unit electrodes;

a second electrode manufacturing apparatus configured to manufacture a second electrode; and a coupling unit configured to couple one of the first unit electrodes and a second unit electrode to each other in order to manufacture a mono cell, wherein the second electrode manufacturing apparatus comprises:

a second electrode transfer unit configured to transfer second electrodes, at least one of the second electrodes being coated with an electrode coating layer;

a second cutter configured to cut the second electrodes when transferred by the second electrode transfer unit and thereby form a second unit electrode;

a second separator transfer unit disposed at one surface of the second electrode transfer unit, the second separator transfer unit being configured to transfer a second separator;

a second sensor unit configured to sense a position each of the second unit electrodes; and a second alignment unit configured to adjust transfer speeds of both ends of the second unit electrodes parallel to a transfer direction of the second unit electrodes in order to adjust an interval between the second unit electrodes that are seated on one surface of the second separator.

5. The electrode assembly manufacturing apparatus according to claim 4, wherein the second alignment unit adjusts the interval between the second unit electrodes based on the position of one of the first unit electrodes sensed by the third sensor unit such that the second unit electrode is aligned with such one of the first unit electrodes at the coupling unit.

6. The electrode assembly manufacturing apparatus according to claim 4, wherein:

the second sensor unit comprises two or more sensors configured to sense positions of opposite side outer peripheries of the second unit electrodes parallel to the transfer direction thereof, the third sensor unit comprises two or more sensors configured to sense positions of opposite side outer peripheries of the first unit electrodes parallel to the transfer direction of the first unit electrodes, and the second alignment unit comprises at least two correction rolls disposed at one surface of each of the second unit electrodes when arranged to be adjusted by the second alignment unit.

7. The electrode assembly manufacturing apparatus according to claim 6, wherein the correction rolls are disposed at an upper surface of each of the second unit electrodes, a transfer roll is disposed under the correction rolls at a lower surface of the second unit electrode, and the transfer roll is configured to have a structure in which a plurality of rollers, speeds of which are capable of being controlled so as to be equal to rotational speeds of the correction rolls, is coupled to each other.

8. The electrode assembly manufacturing apparatus according to claim 4, wherein the coupling unit comprises a rolling roll configured to laminate one of the first unit electrodes and one of the second unit electrodes with each other.

9. The electrode assembly manufacturing apparatus according to claim 4, comprising a third cutter configured to cut the first separator and the second separator of the mono cell to manufacture a unit mono cell having one of the first unit electrodes and one of the second unit electrodes.

10. The electrode assembly manufacturing apparatus according to claim 9, further comprising a vision inspection unit configured to inspect an aligned state of the first unit electrode and the second unit electrode of the unit mono cell.

11. The electrode assembly manufacturing apparatus according to claim 10, wherein a control variable of the second alignment unit is adjusted based on a result of inspection by the vision inspection unit.

\* \* \* \* \*